March 21, 1933. C. HOLDGRAFER 1,902,239
BREAD SERVING APPLIANCE
Filed Nov. 17, 1930 2 Sheets-Sheet 2
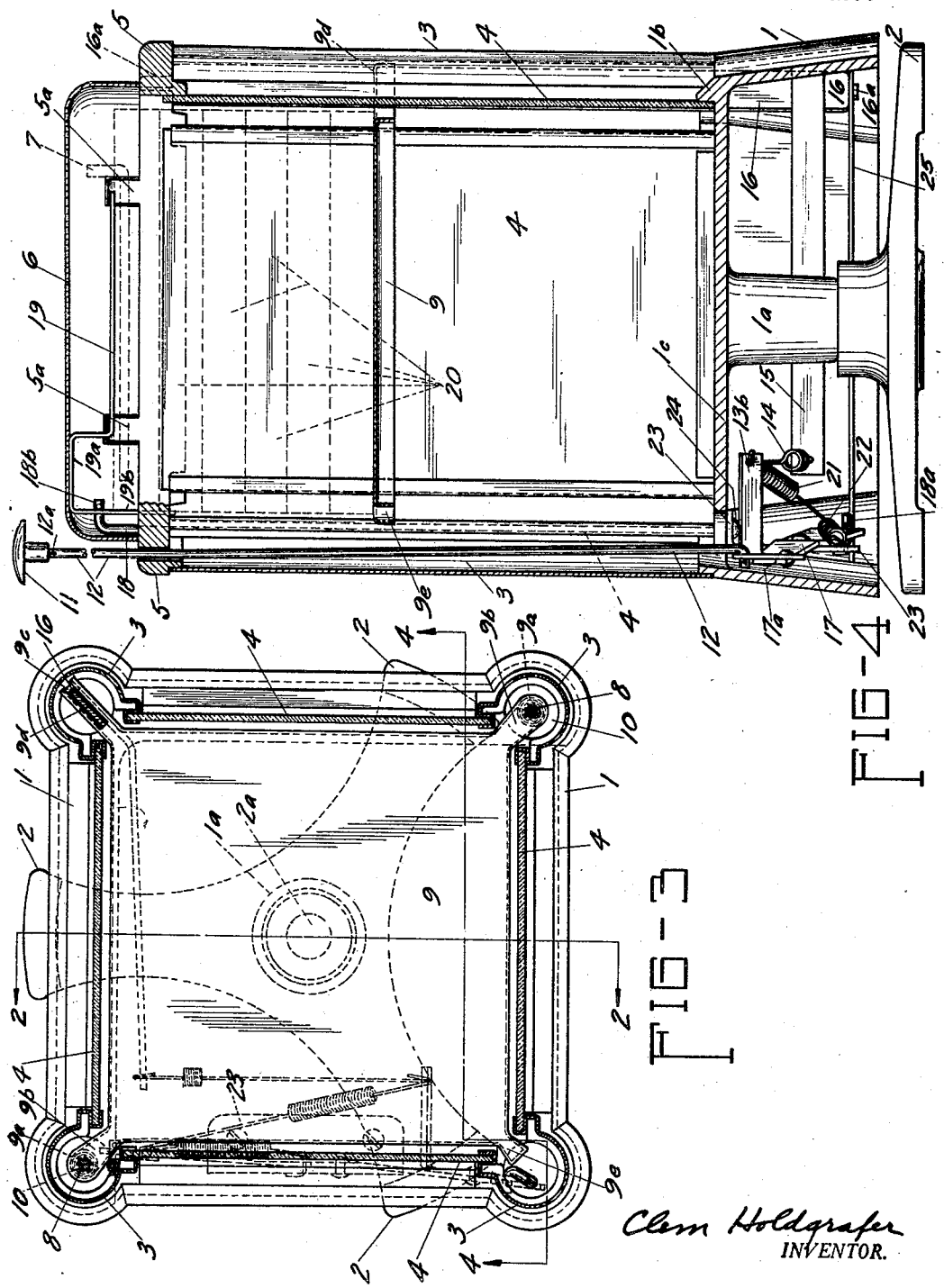

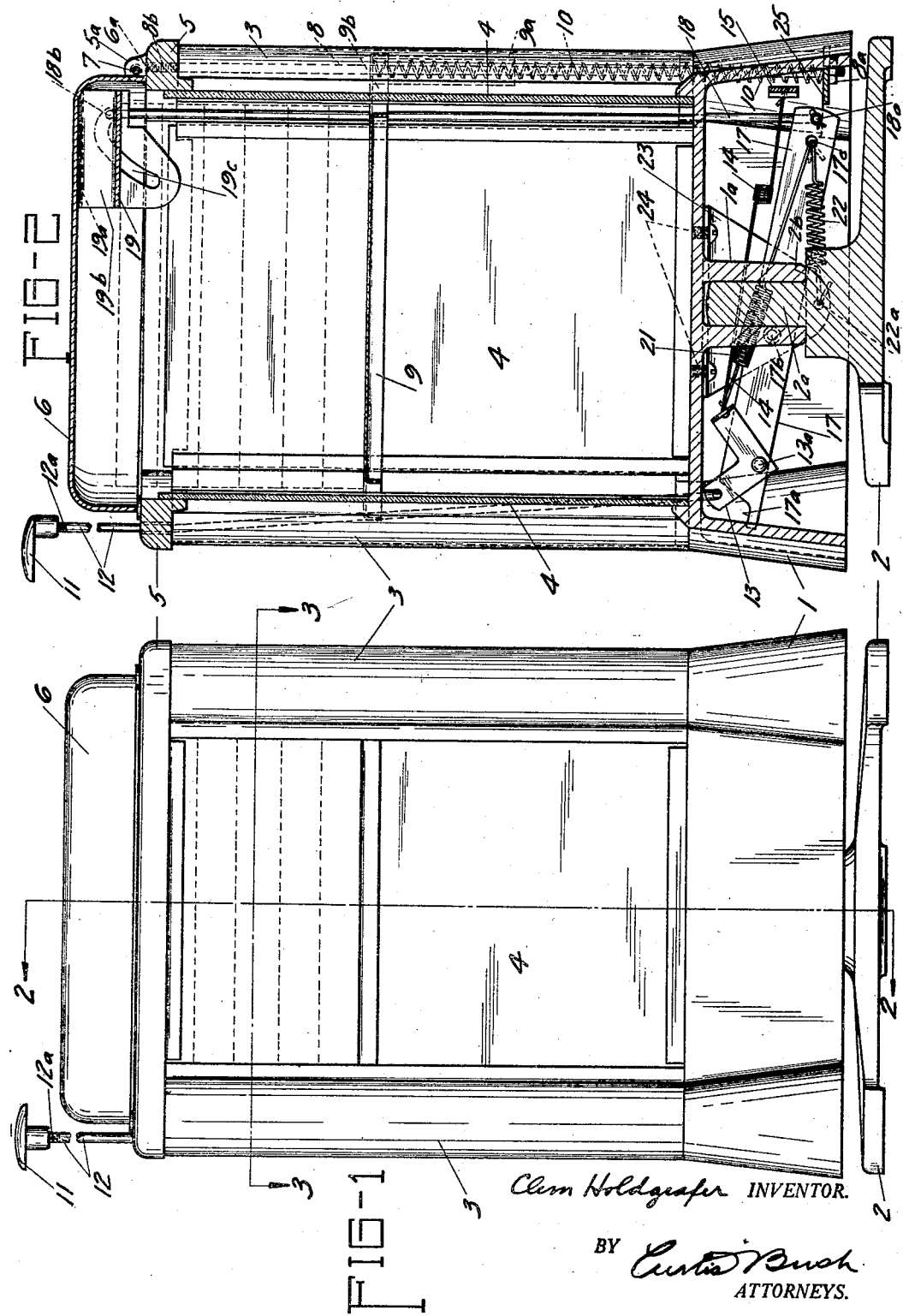
March 21, 1933.  C. HOLDGRAFER  1,902,239
BREAD SERVING APPLIANCE
Filed Nov. 17, 1930   2 Sheets-Sheet 1

Patented Mar. 21, 1933

1,902,239

UNITED STATES PATENT OFFICE

CLEM HOLDGRAFER, OF CLINTON, IOWA

BREAD SERVING APPLIANCE

Application filed November 17, 1930. Serial No. 496,214.

My invention relates to improvements in bread serving appliances.

The objects of my invention are:

1. To provide a simple, economical container for sliced bread for use in homes and eating places, which will keep the bread from drying out and protect it from dirt, flies and other insects and thus prevent the waste of bread which commonly arises where it is served upon an open bread plate;

2. To provide a closed container for bread which can be easily and readily opened and which will automatically carry the bread into a position where it can be readily removed from the container and will automatically close after the slice of bread has been removed therefrom;

3. To provide a closed container for bread in which the bread can readily be seen;

4. To provide a food container which will lend itself readily to advertising uses.

I accomplish these objects by the means illustrated in the accompanying drawings,—in which,—

Figure 1 is a front elevation of my device;

Figure 2 is a vertical section on the lines 2—2 of Figures 1 and 3;

Figure 3 is a horizontal section on the line 3—3 of Figure 1;

Figure 4 is a vertical section on the line 4—4 of Figure 3.

Similar numerals refer to similar parts throughout the several views.

My appliance comprises a base, 1, having a central socket, 1a, formed integral therewith which is pivoted upon a pivot, 2a, united to a swivel base, 2, comprising preferably a plurality of lugs centrally united and having a pivot, 2a, extending upwardly from a central face, 2b.

Upon the base, 1, I secure four columns, 3, which extend upwardly and support a cap or top, 5. The cap, 5, forms a frame in the form of a hollow square which rests upon and is suitably secured at the top of the columns, 3.

The columns, 3, are preferably formed of sheet metal stampings, the edges of which are flanged in a square S-shape, 3a, and side plates, 4, are mounted between the inner flanges of the columns.

The base, 1, is formed integral with a bottom plate, 1c, and has an upturned flange, 1b, extending around the outer edges of the bottom plate to engage the lower edges of the sideplates, 4, between the columns, 3. The upper edges of the side plates, 4, extend into the area formed in the side of the cap, 5.

The cover, 6, is hinged at the rear of the cap, 5, with a hinge pin or pivot, 7, which extends through hinge lugs, 6a, formed upon the cover and hinge lugs, 5a, formed upon the cap, 5.

Tie-rods, 8, unite the cap, 5, to the base, 1, and extend vertically through two of the diagonally opposite columns, 3. In one of the remaining columns, an operating rod, 12, is slidably mounted, having a flattened head, 11, threaded upon the upper end thereof by threads, 12a. In the column diagonally opposite the operating rod, I mount a flat brake-rod, 16, extending vertically of the column, 3.

A platform or elevator, 9, is slidingly mounted upon the tie-rods, 8, with extended sleeves, 9a, surrounding the tie-rods and rigidly united to the platform, 9. Platform lifting springs, 10, comprising long, coiled compression springs, are mounted upon the tie-rods, 8, and extend into the sleeves, 9a. The coiled springs, 10, are formed of sufficient strength and resiliency to carry the platform, 9, upwardly with the bread contained thereon.

At the corner of the platform diagonally opposite the operating lever, I form an arm, 9d, which extends into the adjacent column and has a slot, 9c, formed therein which embraces the brake-rod, 16, and slides lengthwise thereon. The upper end of the brake-rod, 16, is pivoted in the cap, 5, and the lower end of it is pivoted in a suitable support secured to the base or formed integral therewith. A spacing plate, 25, extends around three sides of the base and forms the lower point of attachment for the tie-rods 8, and may form a support for the lower end of the brake-rod, 16.

The slot in the arm, 9d, extends radially outward and the brake-rod, 16, is normally parallel with the slot which is free to slide thereon.

In order to secure the platform against moving upward when the cover is opened, I provide a lever, 15, one end of which is riveted to the lower end of the brake-rod, 16, and the opposite end of which is connected by a spring tie-rod, 14, to an extension, 13b, of a bell-crank lever, 13, secured by a pivot, 13a, to one end of the main operating lever to be hereafter described.

A bracket, 23, is secured to the base on the under side thereof, to which the main operating lever, 17, is pivoted by a pivot, 17b. A coiled tension spring, 22, has one end secured to the lower end of the bracket, 23, and its opposite end secured to one end of the operating lever, 17, and acts to return the lever, 17, to its normal position after one end thereof has been depressed.

The operating rod, 12, has its upper end slidably mounted through a suitable opening in the cap, 5, and its lower end is attached to one arm of the bell-crank lever, 13. The adjacent end of the operating lever, 17, is cut away, but the lower edge thereof has an extension, 17a, which allows it to contact with the lower end of the operating rod, 12, when that is depressed to a certain point. The bell-crank lever, main operating lever and extension thereof, are so proportioned that when the operating rod, 12, is depressed by pressure upon the thumb plate, 11, it will move the bell-crank lever upon its pivot, 13a, for a given distance before contacting with the operating lever, 17.

As the bell-crank lever, 13, is moved upon its pivot, the tie-rod, 14, pulls upon the lever, 15, and tends to turn the brake-rod, 16, upon its pivot, causing it to bind in the slot, 9c, upon the arm, 9d, of the platform and to lock the platform against movement until released.

As the movement of the operating rod, 12, continues, the lower end of it contacts with the extension, 17a, of the operating lever, 17, and depresses the adjacent end of this lever. At the opposite end of the operating lever, 17, I attach a push-rod, 18, which is pivotally secured to the operating lever. This push-rod extends upwardly through one of the columns, 3, and the upper portion of it extends upwardly through a suitable opening in the cap, 5, and the extreme end, 18b, is bent at right angles to the body of the rod. A plate, 19a, is rigidly united to the cover and has a downwardly extending bracket, 19b, formed integral therewith. A slot, 19c, is formed in the bracket, 19b, and receives the end, 18b, of the push-rod. The bracket, 19b, with the slot, 19c, acts as a cam and when the push-rod is pushed upwardly, the end, 18b, of the push-rod bears against the bracket, 19b, and raises it and with it the cover, 6.

At the opposite end of the plate, 19a, I form an extension, 19, which is bent downwardly from the body, 19a, and extends parallel with the cover. This extension, 19, acts as a detent to limit the upward movement of the bread upon the platform or elevator, 9.

A coiled tension spring, 21, has one end connected to the lateral extension, 13b, of the bell-crank lever and its opposite end connected to the opposite end of the operating lever, 17, and acts to return the bell-crank lever to its normal position as shown in Figure 2. The rod or link, 14, has a portion of its length in the form of a coiled tension spring, the strength of which is proportioned so as to afford sufficient pull upon the brake lever, 15, to set the brake and still permit the complete movement of the operating lever, 17, when the operating rod, 12, is moved downwardly.

The side plates, 4, may be of glass or any other suitable material and may be used to carry advertisements or ornamental designs or pictures.

In the operation of my device, the container is mounted upon the swivel base, 2, so as to be free to rotate thereon. The operating rod, 12, is pushed down to its farthest point and through the operating lever, 17, raises the push-rod, 18, which in turn opens the cover, 6. The handle, 11, is then held down manually and the platform or elevator, 9, is manually pushed downward to its farthest point of travel in the container and for this purpose, the pressure upon the head or handle, 11, may be relaxed sufficiently to partly release the brake so that the platform may slide downwardly freely.

The sliced bread is then placed upon the platform, 9, and the head, 11, released. The spring, 22, then acts to return the operating lever, 17, to its normal position, as shown in Figure 2, and as the operating lever, 17, returns to that position, it carries the push-rod, 18, downward and the form of the slot, 19c, is such that the downward pull of the upper end, 18b, of the push-rod, 18, thereon, will act to start the cover downward, but after the cover has started down, it will continue to move by the action of gravity until it has reached its seat upon the cap, 5. The weight of the cover upon the upper end of the push-rod, 18, also assists in returning the push-rod, 18, and the operating lever, 17, to their normal positions as shown in Figure 2.

As the pressure upon the head, 11, is released, the bell-crank lever, 13, is free to return to its normal position and the link, 14, acts to return the brake lever, 15, to its normal position, thus releasing the brake, 16, and relieving the pressure of the brake, 16, upon the sides of the slot, 9c. As the brake is thus released, the elevator springs, 10, exerting pressure upwardly upon the platform, 9. move it upwardly until the bread thereon contacts with the extension, 19, of the plate, 19a. The extension, 19, is so proportioned and mounted as to detain the bread at a point where the top slice of bread will be approximately level with the top of the cap, 5, so that the top slice may be easily and readily removed when the cap is open.

While this serving appliance is designed primarily for sliced bread, it is obvious that it may be used for other food products such as cookies, small cakes, sandwiches, etc., which it is desirable to protect from dirt, flies and from drying out.

In the claims for convenience I refer to the flat brake-bar or rod, 16, as the "brake-bar"; to the lever, 15, as the "brake-arm"; to the bell-crank lever, 13, as the "brake lever"; to the cover-opening rod, 18, as the "push-rod"; to the rod, 12, as the "operating rod"; to the downward extension, 19b, as the "cam bracket"; to the extensions, 9b, of the platform as the "slide-arms" and to the extension, 9d, of the platform, as the "slotted arm"; such terms also being applicable to any equivalents of the parts mentioned.

I claim:

1. A server for sliced bread comprising a container having a base, cap and sides, with a plurality of tie-rods connecting them in assembled position, a cover hinged to the cap, an elevator platform within the container slidingly mounted upon a pair of the tie-rods, coiled springs mounted upon said tie-rods adapted to exert pressure upwardly against the platform, manually operable means to retain the platform stationary when the cover is open and to release same as the cover closes, a push-rod slidingly mounted within the container, a cam bracket united to the cover and having a slot therein embracing the upper end of the push-rod, an operating lever pivoted in the base to one end of which the lower end of the push-rod is pivotally connected, and an operating rod slidingly mounted in the container having its lower end connected with and adapted to actuate the operating lever.

2. A server for sliced bread comprising a container having a base, cap and sides, with a plurality of tie-rods connecting them in assembled position, a cover hinged to the cap, an elevator platform within the container slidingly mounted upon a pair of the tie-rods, coiled springs mounted upon said tie-rods adapted to exert pressure upwardly against the platform, a push-rod slidingly mounted within the container, a cam bracket united to the cover and having a slot therein embracing the upper end of the push-rod, an operating lever pivoted in the base to one end of which the lower end of the push-rod is pivotally connected, an operating rod slidingly mounted in the container having its lower end connected with and adapted to actuate the operating lever, and means for locking the elevator platform against movement while the cover is open and for releasing same as the cover closes.

3. A server for sliced bread comprising a container having a base, cap and sides, with a plurality of tie-rods connecting them in assembled position, a cover hinged to the cap, an elevator platform within the container slidingly mounted upon a pair of the tie-rods, coiled springs mounted upon said tie-rods adapted to exert pressure upwardly against the platform, a push-rod slidingly mounted within the container, a cam bracket united to the cover having a slot therein embracing the upper end of the push-rod, an operating lever pivoted in the base to one end of which the lower end of the push-rod is pivotally connected, an operating rod slidingly mounted in the container having its lower end connected with and adapted to actuate the operating lever, a slotted extension formed integral with the platform, a flat brake-bar pivotally mounted in the container and extending through the slot in the slotted extension of the platform, a lever arm united to the brake-bar, and a pivoted bell-crank lever having one end pivotally connected to the operating lever and the opposite end connected by a link to the brake-arm.

4. A bread server comprising a container having a plurality of vertical tie-rods secured therein, a cover hinged to the container, a rectangular platform having extensions formed at two diametrically opposed corners thereof, sleeves united to such extensions, such sleeves and extensions being slidingly mounted upon diagonally opposite tie-rods in the container, coiled compression springs mounted around and upon the said tie-rods adapted to enter the sleeves and to exert pressure upwardly against the platform, an extension formed at one additional corner of the platform having a slot formed therein, a flat brake-bar pivotally mounted in the container and extending through the slot in said last mentioned extension, and means for turning the brake-bar upon its pivot adapted to cause same to bind against the sides of the slot and to detain the platform against vertical movement while so doing.

5. A bread server comprising a container having a plurality of vertical tie-rods secured therein, a cover hinged to the container, a rectangular platform having extensions formed at two diametrically opposed corners thereof, sleeves united to such extensions, such sleeves and extensions being slidingly mounted upon diagonally opposite tie-rods in the container, coiled compression springs mounted around and upon the said tie-rods adapted to enter the sleeves and to exert pressure upwardly against the platform, an extension formed at one additional corner of the platform having a slot formed therein, a flat brake-bar pivotally mounted in the container and extending through the slot in said last mentioned extension, means for turning the brake-bar upon its pivot adapted to cause same to bind against the sides of the slot and to detain the platform against vertical movement while so doing, a cover-opening mechanism within the container, and means connecting said cover-opening mechanism to said brake-bar and adapted to rotate said bar upon its pivot and cause same to lock the platform against movement while the cover is being opened.

6. In a bread server, the combination with a container having a cover hinged thereto, of a platform slidingly mounted within the container, a narrow slot formed in the platform, a flat brake-bar pivotally mounted in the container and passing through said slot in the platform and upon which said platform may slide freely when in released position, and means for rotating said brake-bar upon its pivot adapted to cause same to bind against the sides of the slot and to restrain the platform from vertical movement while so doing.

7. A bread server comprising a substantially rectangular base, hollow columns mounted at the corners thereof, a cap mounted upon the top of the columns, tie-rods within the columns securing the base, columns and top in assembled position, an elevator slidingly mounted upon a diagonally opposite pair of said tie-rods, a cover hinged to said top, manually operable means for opening the cover, and means connected with and operable by said opening means to lock the platform against movement while the cover is being opened and to release same as the cover closes.

8. A server for sliced bread comprising a container having a base, cap and sides, with a plurality of tie-rods connecting them in assembled position, a cover hinged to the cap, an elevator platform within the container slidingly mounted upon a pair of the tie-rods, coiled springs mounted upon said tie-rods adapted to exert pressure upwardly against the platform, and manually operable means to open the cover and to lock the platform in stationary position before the cover opens.

9. A server for sliced bread comprising a container having a base, cap and sides, with a plurality of tie-rods connecting them in assembled position, a cover hinged to the cap, an elevator platform within the container slidingly mounted upon a pair of tie-rods, coiled springs mounted upon said tie-rods adapted to exert pressure upwardly against the platform, and manually operable means to open the cover and to lock the platform in stationery position before the cover opens and to hold it locked until the cover is closed.

In testimony whereof he affixes his signature.

CLEM HOLDGRAFER.